(12) United States Patent
Thomas

(10) Patent No.: US 9,719,598 B2
(45) Date of Patent: Aug. 1, 2017

(54) SEAL WITH CONNECTING INSERT

(71) Applicant: Michael Thomas, Sycamore, IL (US)

(72) Inventor: Michael Thomas, Sycamore, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/824,415

(22) Filed: Aug. 12, 2015

(65) Prior Publication Data
US 2017/0045142 A1    Feb. 16, 2017

(51) Int. Cl.
| F16J 15/32 | (2016.01) |
| F16J 15/3268 | (2016.01) |
| F16J 15/3204 | (2016.01) |
| F16J 15/3252 | (2016.01) |

(52) U.S. Cl.
CPC ....... F16J 15/3268 (2013.01); F16J 15/3204 (2013.01); F16J 15/3252 (2013.01)

(58) Field of Classification Search
CPC .... F16J 15/3204; F16J 15/3216; F16J 15/322; F16J 15/3248; F16J 15/3252; F16J 15/3268
See application file for complete search history.

(56) References Cited

U.S. PATENT DOCUMENTS

| 4,304,414 | A | | 12/1981 | Forch | |
|---|---|---|---|---|---|
| 4,623,153 | A | | 11/1986 | Nagasawa | |
| 4,664,392 | A | | 5/1987 | Hatch | |
| 4,721,314 | A | * | 1/1988 | Kanayama | F16J 15/3252 277/562 |
| 4,822,059 | A | | 4/1989 | Shimasaki | |
| 4,943,068 | A | * | 7/1990 | Hatch | F16J 15/3256 277/353 |
| 5,052,696 | A | | 10/1991 | Hatch | |
| 6,123,514 | A | | 9/2000 | Kawaguchi | |
| 6,209,879 | B1 | | 4/2001 | Mizunoya | |
| 6,367,810 | B1 | | 4/2002 | Hatch | |
| 6,517,083 | B2 | | 2/2003 | Yamada | |
| 6,840,521 | B2 | | 1/2005 | Ikeda | |
| 7,753,377 | B2 | | 7/2010 | Laplante | |
| 8,256,772 | B2 | | 9/2012 | Itadani | |
| 8,579,297 | B2 | * | 11/2013 | Arita | F16J 15/3232 277/551 |
| 2002/0185822 | A1 | | 12/2002 | Spain | |
| 2009/0134585 | A1 | * | 5/2009 | Shimomura | F16J 15/3216 277/562 |
| 2010/0244389 | A1 | * | 9/2010 | Sanada | F16J 15/3228 277/565 |
| 2014/0062031 | A1 | * | 3/2014 | Honzek | B60C 23/003 277/551 |
| 2014/0151967 | A1 | * | 6/2014 | Benedix | F16J 15/3244 277/559 |

OTHER PUBLICATIONS

Non-Final Office Action dated Jul. 15, 2016, U.S. Appl. No. 14/867,145, filed Sep. 28, 2015, pp. 1-8.

* cited by examiner

*Primary Examiner* — Gilbert Lee
(74) *Attorney, Agent, or Firm* — Mark Ussai; SKF USA Inc. Patent Dept.

(57) ABSTRACT

A seal including a generally annular casing, a generally annular sealing element that is configured to seal with a relatively movable member, and an insert coupled with the sealing element and the casing. The insert substantially maintains a relative position of at least a portion of the casing and at least a portion of the sealing element.

24 Claims, 6 Drawing Sheets

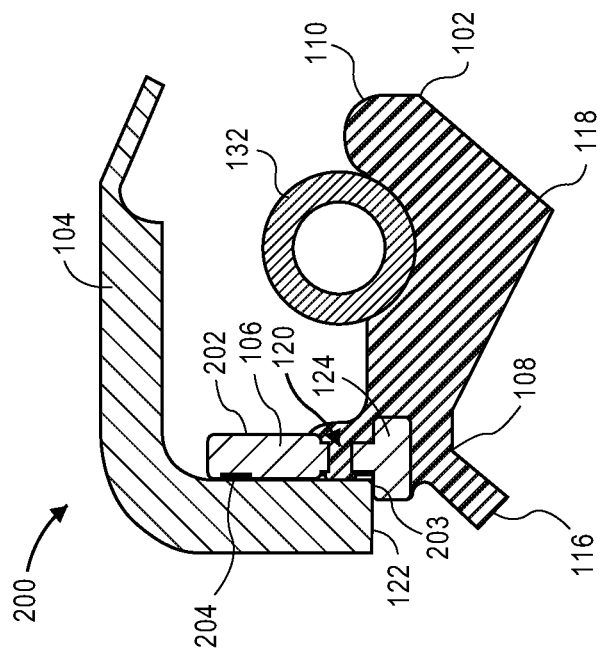
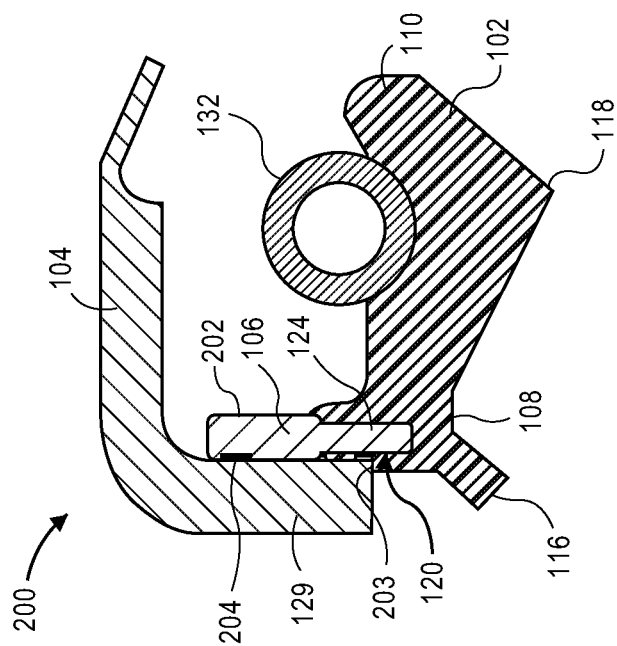

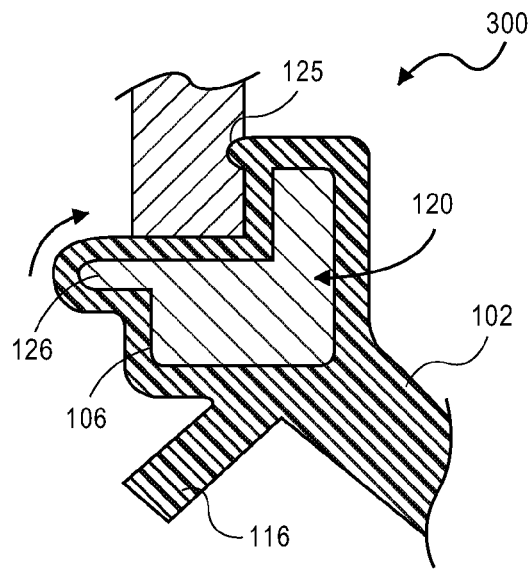
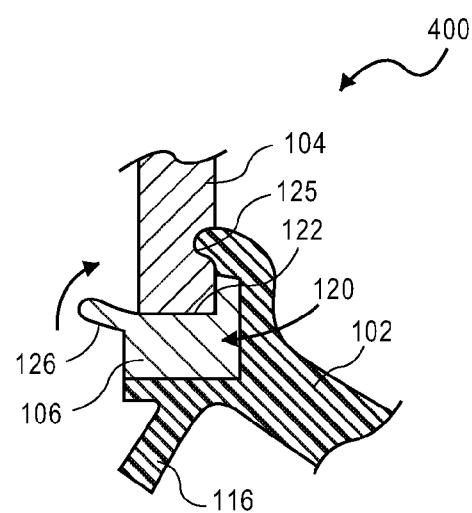
FIG. 3  FIG. 4
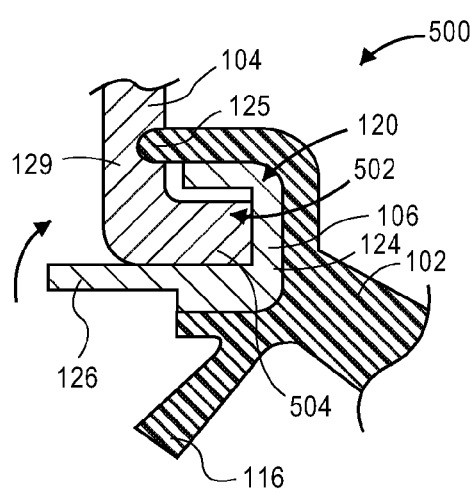
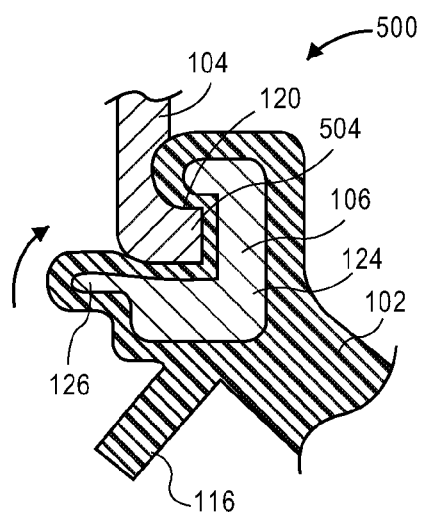
FIG. 5  FIG. 6

SEAL WITH CONNECTING INSERT

BACKGROUND

Radial seals are used in a variety of industrial contexts. For example, seals may be used to protect a bearing from contaminants and maintain grease or oil therein. The seals generally include a flexible element that engages (or nearly engages) a rotating element, often a shaft, and a more rigid element that connects with a housing or another generally stationary body. The seal thus allows the shaft to rotate (or otherwise move) relative to the housing, while maintaining a seal.

Many different sizes of seals are employed in different machines. Seals are thus often custom-designed for the particular machine in which they are used. Accordingly, relatively small customer orders for such seals may present a challenge, because it may not be practical to maintain a large inventory of every conceivable size of seal. Thus, such small orders may result in essentially a custom manufacturing run of the ordered seal. Typically, manufacturers react by attempting to simplify the manufacturing process, reducing the part count wherever possible. While this may be effective in some contexts, the challenge of inventory limitations may persist, and such small runs may make the seal manufacturing less economical.

SUMMARY

Embodiments of the disclosure may provide a seal including a generally annular casing, a generally annular sealing element that is configured to seal with a relatively movable member, and an insert coupled with the sealing element and the casing. The insert substantially maintains a relative position of at least a portion of the casing and at least a portion of the sealing element.

Embodiments of the disclosure may also provide a generally annular seal including a sealing element disposed around and extending axially along a shaft. The sealing element includes a lip configured to seal with the shaft, and the sealing element defining a pocket. The seal also includes an insert attached to the sealing element and including a base disposed in the pocket and a radial extension extending outwards from the base. The seal further includes a casing attached to the insert. At least a portion of the casing extends axially, generally parallel to the sealing element.

BRIEF DESCRIPTION OF THE DRAWINGS

The accompanying drawings, which are incorporated in and constitutes a part of this specification, illustrates an embodiment of the present teachings and together with the description, serves to explain the principles of the present teachings. In the figures:

FIGS. 1, 2A, 2B, 3, 4, 5, 6, 7, 8, 9, 10, and 11 each illustrate a partial, cross-sectional view of a seal, according several embodiments.

Figure 1:
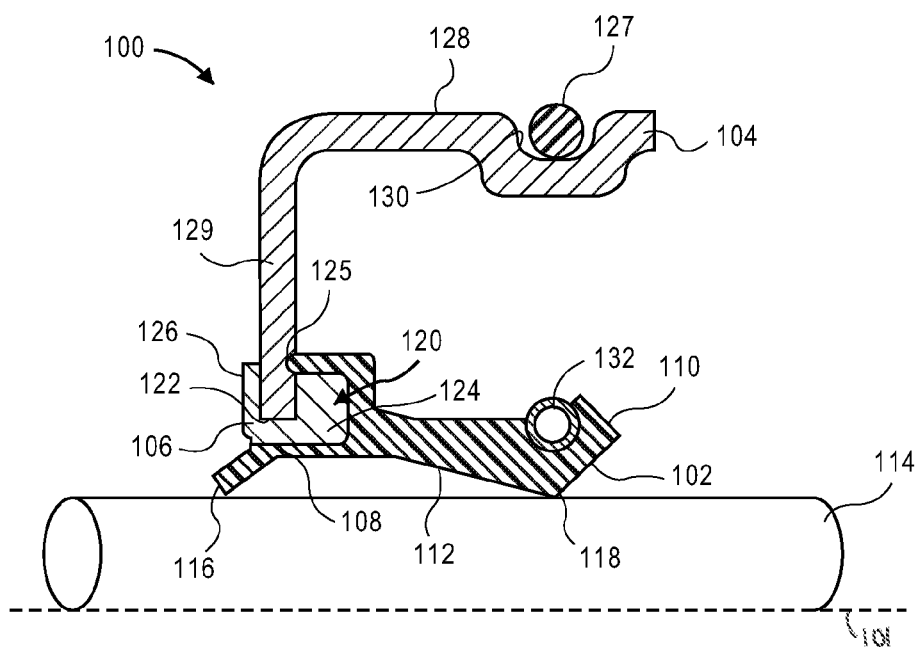

It should be noted that some details of the figures have been simplified and are drawn to facilitate understanding of the embodiments rather than to maintain strict structural accuracy, detail, and scale.

DETAILED DESCRIPTION

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

In general, embodiments of the present disclosure may provide a seal with three (or more) modular parts that may be connected together to form a seal. The parts may include a casing, a sealing element, and an insert that connects the sealing element and the casing together. The insert may allow for connecting the casing and the sealing element together after both elements are constructed, while maintaining strength and seal integrity. Further, such modular construction may allow for modifications to the casing and sealing element, such that each is configurable to form a range of sizes. Thus, an inventory of such modular components may be kept, which may be efficiently modified for use in a variety of seal sizes.

Turning now to the illustrated example embodiments, FIG. 1 depicts a partial, cross-sectional view of a seal 100, according to an embodiment. The seal 100 may be generally annular, and thus it will be appreciated that the illustrated cross-section may extend around a longitudinal axis 101 (horizontal in this view). However, in some embodiments, the cross-section may not remain constant but may have differences along the circumferential direction.

The seal 100 may generally include a sealing element 102, a casing 104, and a connecting insert 106. The sealing element 102, casing 104, and insert 106 may be generally annular. A component may be considered "generally annular" when it has an inner diameter and an outer diameter, although the inner and outer diameter surfaces need not be continuous and may be broken up, for example, by slots formed therein.

The sealing element 102 may extend between first and second axial ends 108, 110 and may define an inner diameter 112. The inner diameter 112 may extend axially along a relatively movable member, e.g., a shaft 114, and may be configured to seal with or otherwise engage therewith. To accomplish such sealing with the shaft 114, the sealing element 102 may include one or more lips 116 and/or one or more inner profiles 118. The sealing element 102 may be made of a relatively soft, elastic material, such as rubber or another elastomer. In other embodiments, the sealing element 102 may be made at least partially from a fiber-reinforced material (e.g., a "composite material"), a plastic, or any other suitable material.

The sealing element 102 may also define a pocket 120 in which the insert 106 may be received. The pocket 120 may contact two or more sides of the insert 106, and in some embodiments, may contact three or more sides of the insert 106. Further, the insert 106 may be bonded to the sealing element 102 in the pocket 120, so as to be retained at least partially within the pocket 120. Furthermore, the sealing element 102 may be formed (e.g., molded) around the insert 106 when the sealing element 102 is being constructed. For example, the insert 106 may be placed within a mold, and then the sealing element 102 may be molded around the insert 106, potentially with the insert 106 having been pre-applied with adhesive for bonding the insert 106 and the sealing element 102 together. Accordingly, the insert 106 may be made from a material with a higher melting point than the sealing member 102, and/or may be made from a material with a higher rigidity. In this way, the insert 106 may serve to provide a shape to what may otherwise be a relatively deformable sealing element 102. In an example, the insert 106 may be formed from a metal, (e.g., an alloy of two or more metals), a plastic, a composite material, or the like.

The casing 104 may be coupled with or otherwise attached to the insert 106 in a variety of ways. In the example illustrated in FIG. 1, an inner end 122 of the casing 104 is received axially between a base 124 of the insert 106 and a crimping extension 126 thereof that extends from the base 124. The crimping extension 126 may initially extend axially, and may be bent to the illustrated radial orientation, so as to form an interference fit (crimp) with the casing 104, which may prevent the end 122 of the casing 104 from moving relative to the insert 106. Since the insert 106 is attached to the sealing element 102, similarly in a fixed-position with respect thereto, the insert 106 may generally prevent relative dislocation of the casing 104 and the sealing element 102. Either or both of the casing 104 and the sealing element 102 may bend or otherwise deflect during installation, operation, etc., and thus the connection provided by the insert 106 may be defined as "substantially" preventing at least a portion of the casing 104 from moving with respect to at least a portion of the sealing element 102; particularly, the end 122 of the casing 104 and at least a portion of the first axial end 108 may be maintained generally in a fixed position relative to one another.

The sealing element 102 may also include a sealing rib 125, which may provide a sealing interface between the sealing element 102 and the casing 104, e.g., a radial section 129 thereof. In an embodiment, the sealing rib 125 may extend axially. Accordingly, the interface between the casing 104 and the insert 106 may, in some embodiments, not be fluid-tight, but in other embodiments, it may be. The sealing rib 125 may be rounded, as shown, but in other embodiments, may be any other suitable shape. Furthermore, the sealing rib 125 may be integral with the remainder of the sealing element 102, as shown, but in other embodiments, may be provided by a separate member (e.g., an O-ring) coupled with the sealing element 102 and disposed between the sealing element 102 and the casing 104.

The seal 100 may also include an outer seal 127, which may be configured to form a seal between an outer, axially-extending section 128 of the casing 104 and a bore of a housing in which the seal 100 is disposed in an embodiment. In at least one example, the outer section 128 of the casing 104 may define a recess 130 in which the outer seal 127 (e.g., an O-ring) is disposed. Further, as shown, the outer section 128 may extend axially, generally parallel to the sealing element 102, from the first axial end 108 thereof toward the second axial end 110, such that the sealing element 102 and the outer section 128 are axially-aligned and radially-offset from one another.

Further, the seal 100 may include a spring ring 132, e.g., near to or at the second axial end 110. The spring ring 132 may be configured to expand elastically during installation and thus apply a generally uniform, radially-inward force on the sealing element 102, causing the sealing element 102 to engage the shaft 114.

Although the present embodiment of the seal 100 has been described with the sealing element 102 radially-inward of the casing 104, it will be appreciated that this arrangement may be reversed, e.g., in situations where the shaft 114 is stationary and the outer housing is relatively movable.

FIG. 2A illustrates a partial, cross-sectional view of another seal 200, according to an embodiment. The seal 200 may include components that are similar to those of the seal 100 (FIG. 1), and such similar components are given like numbers and a duplicate description is omitted.

As with the seal 100, the sealing element 102 of the seal 200 may include the pocket 120 in which the base 124 of the insert 106 may be received and retained, e.g., by bonding, molding, or both. However, the pocket 120 may open on a radial side, e.g., the radial outer side thereof, such that the base 124 may extend radially therein. Further, the insert 106 may include a radial extension 202 extending outwards from the base 124, e.g., parallel to the radial section 129 of the casing 104. The sealing rib 125 may be positioned between the radial section 129 and the radial extension 202, between the base 124 and the radial section 129, or elsewhere with respect to the insert 106 and/or the casing 104. Further, the casing 104 may also or instead engage a shoulder 203 of the sealing element 102, at or proximal to the first axial end 108 thereof, which may form a primary or secondary seal between the casing 104 and the sealing element 102.

The radial extension 202 of the insert 106 may be connected with the radial section 129 of the casing 104, e.g., by welding or soldering, at a connection location 204. The radial extension 202 may be disposed between the casing 104 and the second axial end 110 of the sealing element 102, and the connection location 204 may be between the insert 106 and the casing 104; thus, the connection location 204 may likewise be between the radial section 129 and the second axial end 110. In another embodiment, the connection location 204 may be on the radially-outer edge of insert 124, e.g., on the corner toward the radial section 129 of the casing 104. Moreover, any of the mentioned connections (e.g., weldings, solderings, bondings, etc.) may be located at different points around the circumference of the surfaces or may extend continuously around the circumference.

FIG. 2B illustrates a partial, cross-sectional view of another embodiment of the seal 200. In this embodiment, the pocket 120 may be open in a radial direction and in an axial direction, and the insert 106 may have a larger base 124. Further, the base 124 may provide the shoulder 203 against which the end 122 of the casing 104 may rest. In addition, the sealing rib 125 may extend though an aperture (e.g., hole, slot, etc.) formed in the insert 106, and into engagement with the casing 104.

FIG. 3 illustrates a partial, cross-sectional view of a seal 300, according to an embodiment. The seal 300 may include components that are similar to those of the seal 100 (FIG. 1), and such similar components are given like numbers and a duplicate description is omitted. As shown, the insert 106 may be embedded within the sealing element 102, such that, for example, the sealing element 102 may fully envelope the insert 106. In an embodiment, the pocket 120 of the sealing element 102 may thus not be open. In such case, the insert 106 might not be bonded with the sealing element 102, as the material of the sealing element 102 may be sufficient to retain the insert 106.

With the insert 106 internal to the sealing element 102, the sealing element 102 may form an interface between the casing 104 and the insert 106, although the insert 106 may still be considered to be coupled with and/or attached to both. In an example, the insert 106 may include the crimping extension 126, which may be surrounded by the sealing element 102. When the casing 104 is in place, the crimping extension 126 may be bent radially, along with the portion of the sealing element 102 surrounding it, until the combination of the crimping extension 126 and the sealing element 102 engages the casing 104 and retains the end 122 thereof. In such an embodiment, the sealing rib 125 (FIG. 1) might be omitted, as the interface between the casing 104 and the insert 106 is formed by the sealing element 102, thus forming a seal. In other embodiments, the sealing rib 125 may be provided, e.g., as a secondary seal.

FIG. 4 illustrates a partial, cross-sectional view of a seal 400, according to an embodiment. The seal 400 may include components that are similar to those of the seal 100 (FIG. 1), and such similar components are given like numbers and a duplicate description thereof is omitted. In the illustrated example, the end 122 of the casing 104 of the seal 400 may be press-fit into the base 124 of the insert 106. The crimping extension 126 may then be deformed into engagement with the casing 104, thereby retaining the casing 104 in position relative to the sealing element 102.

FIG. 5 illustrates a partial, cross-sectional view of a seal 500, according to an embodiment. The seal 500 may include components that are similar to those of the seal 100 (FIG. 1), and such similar components are given like numbers and a duplicate description thereof is omitted. In the illustrated example, the casing 104 may have an axially-extending lip 504, which may extend from the radial section 129. Further, the pocket 120 defined in the sealing element 102 may be open in an axial direction, so as to receive the lip 504 therein. In addition, the base 124 of the insert 106, which is received into the pocket 120, may define a recess 502 therein, which also extends axially and is shaped to receive the lip 504 therein. The crimping extension 126 may extend from one radial side of the base 124, and may be configured to be bent into engagement with the casing 104, e.g., near the intersection of the radial section 129 and the lip 504. Accordingly, the lip 502 may serve as a hook, providing for an increased resistance to at least radial displacement of the casing 104 from the insert 106 and/or the sealing element 102.

FIG. 6 illustrates a partial, cross-sectional view of another embodiment of the seal 500. Like the seal 500 shown in FIG. 5, the seal 500 illustrated in FIG. 6 includes the axially-extending lip 504, which is received into the pocket 120 and the recess 504. Further, the insert 106 may be embedded (e.g., fully enveloped) in the sealing element 102, such that the sealing element 102 forms the interface between the insert 106 and the casing 104. Thus, when the casing 104, the insert 106, and the sealing element 102 are assembled, the lip 504 may engage the sealing element 102, thereby potentially forming a seal therewith. The crimping extension 126 may be deformed, so as to retain the lip 504 in the pocket 120.

Figure 7:
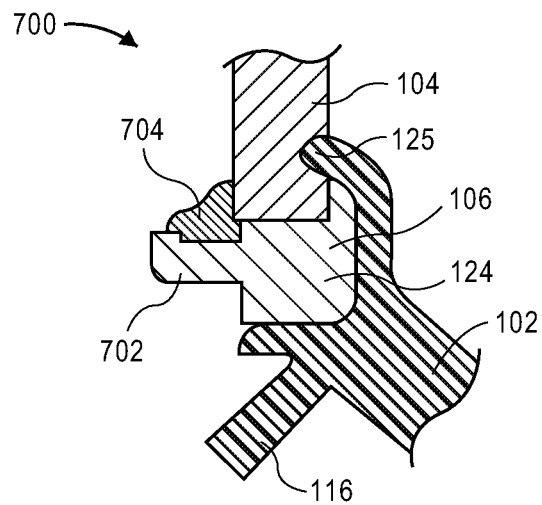

FIG. 7 illustrates a partial, cross-sectional view of a seal 700, according to an embodiment. The seal 700 may include components that are similar to those of the seal 100 (FIG. 1), and such similar components are given like numbers and a duplicate description thereof is omitted. In the illustrated example, the insert 106 may include a ledge 702 extending away from the base 124 that is attached to the sealing element 102. The end 122 of the casing 104 may be received onto the base 124 proximal, e.g., adjacent, to the ledge 702. Thereafter, a molten material 704, such as metal or plastic, may deposited onto the ledge 702, such that the molten material 704 contacts both the casing 104 and the ledge 702. The molten material 704 may then solidify, forming a connection between the insert 106 (via the ledge 702) and the casing 104.

Figure 8:
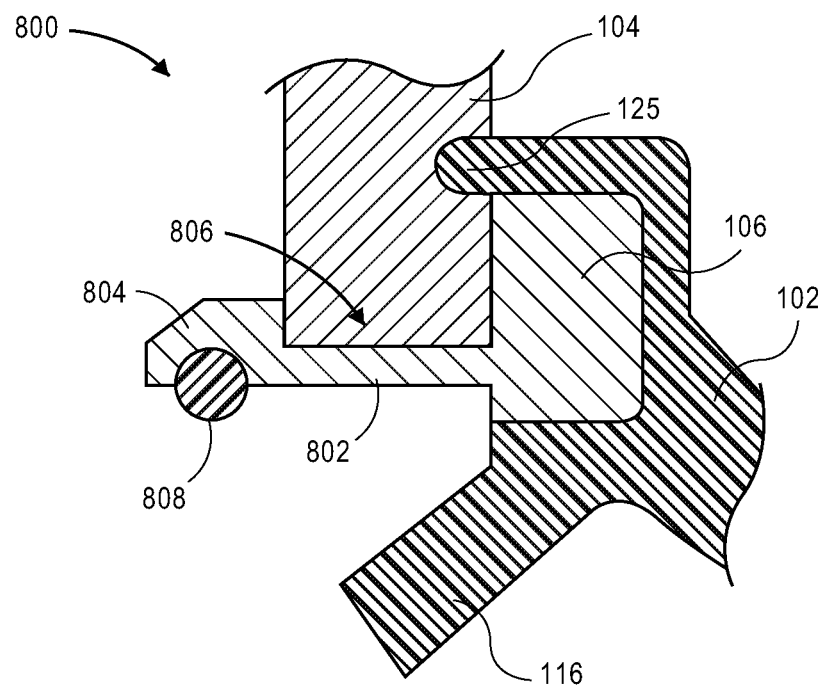

FIG. 8 illustrates a partial, cross-sectional view of a seal 800, according to an embodiment. The seal 800 may include components that are similar to those of the seal 100 (FIG. 1), and such similar components are given like numbers and a duplicate description thereof is omitted. In the illustrated example, the insert 106 includes a ledge 802 extending axially from the base 124 thereof. The ledge 802 includes a radially-extending rib 804 toward the distal end thereof, such that a recess 806 is defined axially between the rib 804 and the base 124. The ledge 802 in the recess 806 may be relatively thin compared to the rib 804 and the base 124, and thus may resiliently deflect to enlarge at least part of the recess 806. The end 122 may be slightly wider (in axial dimension) than the recess 806. Accordingly, when the end 122 is received into the recess 806, the ledge 802 may resiliently deflect to accommodate the end 122, and may apply reactionary pressure thereto, forming an interference or "snap" fit therewith.

The seal 800 may also include a wire 808, which may engage the ledge 802, e.g., proximal to the rib 804. The wire 808 may increase a rigidity of the ledge 802 and thus may increase a holding force between the insert 106 and the casing 104.

Figure 9:
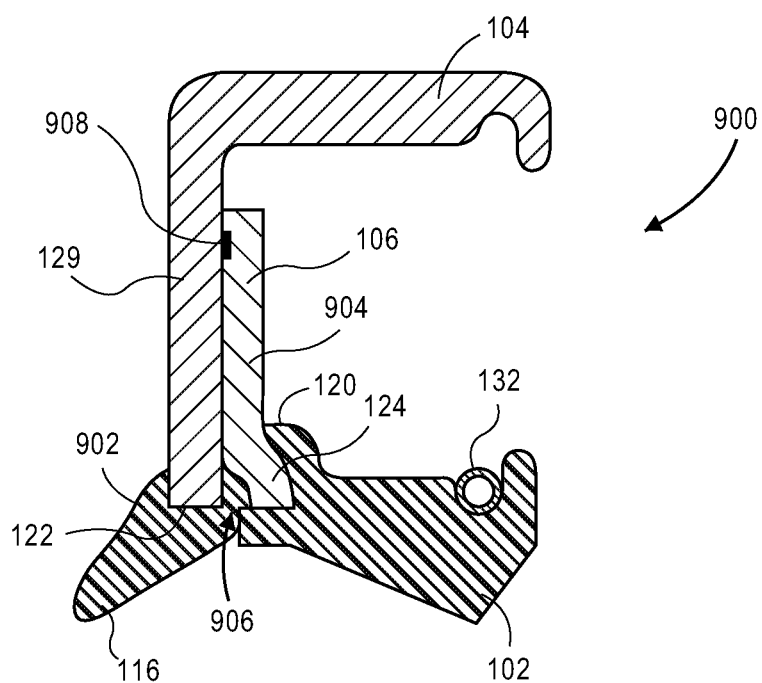

FIG. 9 illustrates a partial, cross-sectional view of a seal 900, according to an embodiment. The seal 900 may include components that are similar to those of the seal 100 (FIG. 1), and such similar components are given like numbers and a duplicate description thereof is omitted. In the illustrated embodiment, the casing 104 of the seal 900 may be coupled with the insert 106 using a formable connecting material 902. In an embodiment, the material 902 may be made at least partially from an elastomer, such as a thermoplastic polyurethane elastomer (TPU), for example, ECOPUR®. The material 902 may also form a portion of the sealing element 102, such as the lip 116 thereof. In other embodiments, the sealing element 102 may form the lip 116, while the material 902 may form another lip, other structures, or may simply connect the casing 104 with the insert 106, for example, as described below.

In an embodiment, the insert 106 may have a radial extension 904 that may abut and engage the casing 104 along the radial section 129 thereof. The insert 106 may be curved away from the casing 104 proximal the base 124 thereof, as it is received into the pocket 120. The insert 106 and the casing 104 may thus form a gap 906 therebetween. Accordingly, the material 904 may be received around the end 122 and into the gap 906, thereby connecting the casing 104 with the insert 106.

The radial extension 904 of the insert 106 may be attached to the radial section 129 of the casing 104 at a connection location 908. The connection location 908 may be formed by welding, bonding, soldering, or any other suitable connection process.

Figure 10:
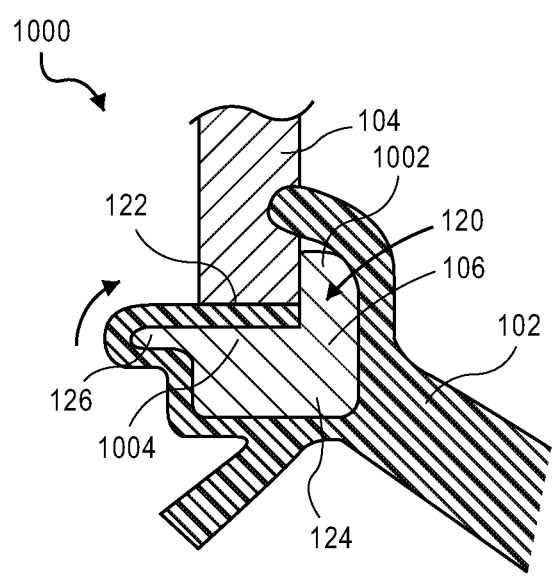

FIG. 10 illustrates a partial, cross-sectional view of a seal 1000, according to an embodiment. The seal 1000 may include components that are similar to those of the seal 100 (FIG. 1), and such similar components are given like numbers and a duplicate description thereof is omitted. In the illustrated embodiment, the insert 106 may include the base 124 and the crimping extension 126. Furthermore, the base 124 may include a radially-extending section 1002 and an axially-extending section 1004.

The insert 106 may be partially embedded in the pocket 120, such that the sealing element 102 forms an interface between the casing 104 and the crimping extension 126 and the axially-extended section 1004. The radially-extending section 1002 of the insert 106 may not be embedded in the sealing element 102, such that direct engagement (e.g., metal-to-metal) between the casing 104 and the radially-extending section 1004 may be observed. Accordingly, the sealing element 102 disposed between the axially-extending section 1004 and the end 122 may form a seal therebetween. Further, the sealing rib 125 may form a second sealing interface, and may be positioned radially outward of the radially-extending section 1002.

Figure 11:
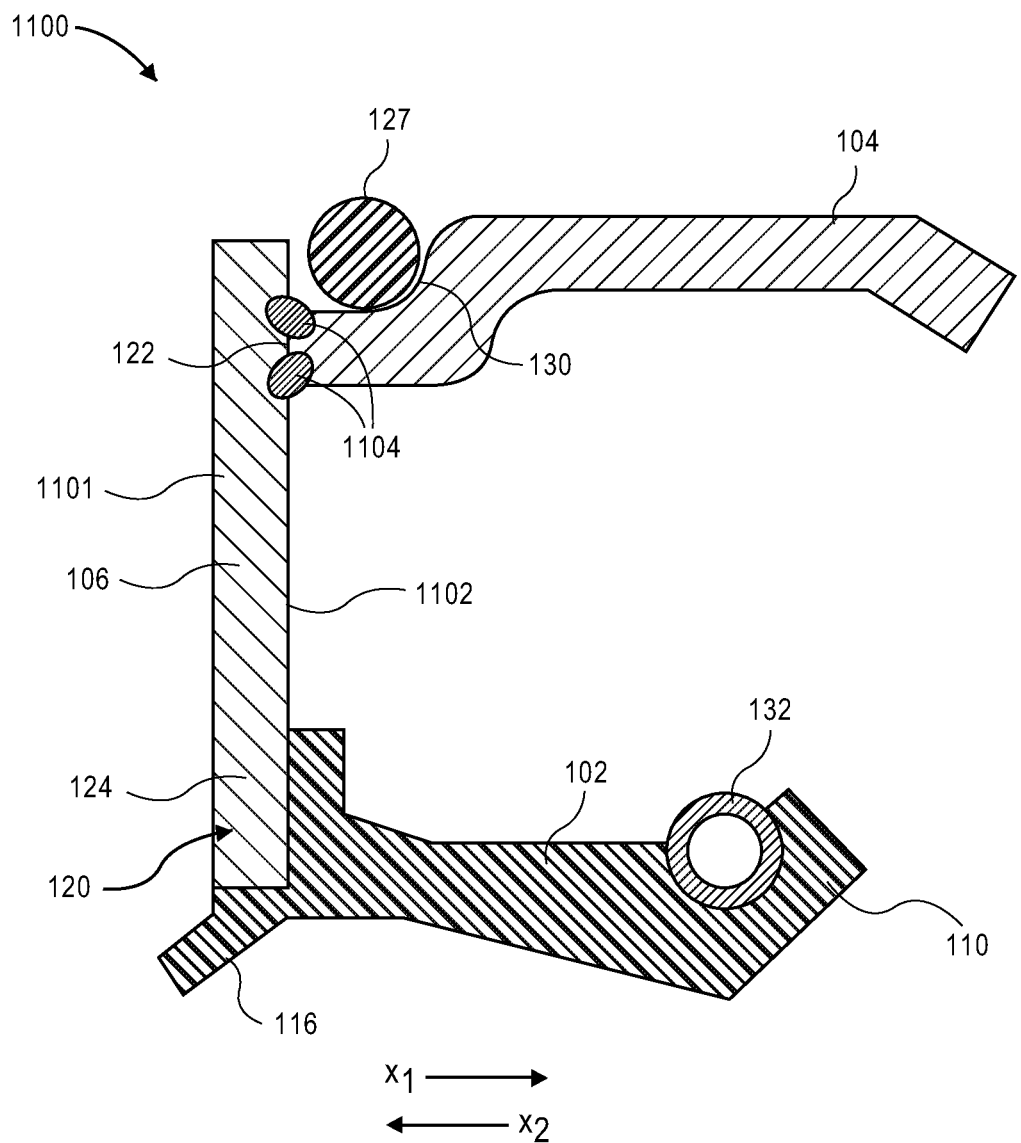

FIG. 11 illustrates a partial, cross-sectional view of a seal 1100, according to an embodiment. The seal 1100 may include components that are similar to those of the seal 100 (FIG. 1), and such similar components are given like numbers and a duplicate description thereof is omitted. In the illustrated example, the insert 106 may include the base 124 received into the pocket 120 and may have a larger radial extension 1101 that may take the place of the radial section 129 of the casing 104, as compared to the previous embodiments. The radial extension 1101 may include an axial face 1102, which faces in a first axial direction $X_1$. As the term is used here, an "axial direction" means a direction that is parallel to the central, longitudinal axis of the seal 1100.

The casing 104 may be radially offset (e.g., outside of) the sealing element 102, and the casing 104 and the sealing element 102 may extend generally parallel to one another, away from the insert 106. As shown, the casing 104 and the sealing element 102 extend away from the insert 106 in the first axial direction $X_1$. Further, the end 122 of the casing 104 may face in a second axial direction $X_2$, opposite to the first axial direction $X_1$. The end 122 may be connected with the radial section 1102 at one or more connection locations 1104. The connection location 1104 may be axially between the casing 104 and the insert 106.

In an embodiment, the casing 104 may be welded to the radial extension 1101 at the connection location 1104. In other embodiments, however, the insert 106 may be welded or otherwise attached to a radial face of the casing 104. Further, as shown, the casing 104 may be shaped such that the recess 130 for the outer sealing element 127 is adjacent to the end 122 and/or partially defined by the insert 106.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A seal, comprising:
a generally annular casing comprising a radially-extending section and an axially-extending section connected to or integrally-formed with the radially-extending section;
a generally annular sealing element that is configured to seal with a relatively movable member; and
an insert coupled with the sealing element and the casing, wherein the insert substantially maintains a relative position of at least a portion of the casing and at least a portion of the sealing element,
wherein the radially-extending section of the casing is connected to the insert and at least a portion of the radially-extending section extends radially outward from the insert, and
wherein the axially-extending section of the casing is positioned radially outward from the sealing element and the insert, such that the insert is entirely radially inward of the axially-extending section.

2. The seal of claim 1, wherein the insert is generally annular.

3. The seal of claim 1, wherein the insert is bonded with the sealing element.

4. The seal of claim 1, wherein the insert is disposed at least partially within a pocket of the sealing element.

5. The seal of claim 4, wherein the sealing element further comprises a sealing ridge, the sealing ridge directly engaging the casing thereby forming a sealing engagement directly with the casing.

6. The seal of claim 4, wherein the insert is embedded in the pocket, such that the sealing element defines an interface between the casing and the insert.

7. The seal of claim 4, wherein the insert comprises a base disposed in the pocket and coupled with the sealing element, and a ledge extending axially from the base, wherein an end of the casing engages the ledge, and wherein the seal further comprises a connecting material directly in contact with the ledge and the casing.

8. The seal of claim 4, wherein the insert comprises a base disposed in the pocket and coupled with the sealing element, and a ledge extending axially from the base, wherein the ledge defines a recess, an end of the casing being received into the recess, and the casing forming an interference fit with the ledge.

9. The seal of claim 1, wherein the insert comprises a base coupled with the sealing element and a crimping extension extending from the base, wherein the crimping extension is configured to be deformed into engagement with the casing, to retain the casing in engagement with the insert.

10. The seal of claim 1, wherein the insert comprises a base coupled with the sealing element and a radial extension extending from the base and engaging the casing.

11. The seal of claim 10, wherein the sealing element comprises a first axial end and a second axial end, the insert being coupled with the sealing element proximal to or at the first axial end, and wherein the casing is connected to the insert at a connection location, the insert being disposed between the connection location and the second axial end.

12. The seal of claim 10, wherein the radial extension is welded or soldered to the insert.

13. The seal of claim 1, wherein the sealing element comprises a sealing lip on an inner diameter thereof, for sealing with the relatively movable member.

14. The seal of claim 1, wherein the casing is formed from a metal or metal alloy, the insert is formed from a metal or metal alloy, and the sealing element is formed from an elastomer.

15. The seal of claim 1, wherein the sealing element comprises a first axial end and a second axial end, the insert being coupled with the sealing element proximal to or at the first axial end, and wherein the casing is welded or soldered to the insert at a connection location, the casing being disposed between the connection location and the first axial end.

16. The seal of claim 1, wherein further comprising a formable coupling material forming a sealing lip of the sealing element, the sealing lip being configured to seal with the relatively movable member, wherein the formable coupling material is connected with the insert and the sealing element.

17. The seal of claim 1, wherein an interface between the insert and the casing is not fluid-tight, and wherein the sealing element is configured to prevent fluid flow between the insert and the casing.

18. The seal of claim 1, further comprising an outer seal, wherein the axially-extending section of the casing defines a recess in which the outer seal is positioned, the outer seal being configured to seal between the casing and a bore of a housing, the outer seal being separate from the sealing element.

19. The seal of claim 1, wherein an end of the casing is configured to be received into the insert after the insert is formed.

20. The seal of claim 1, wherein a radially-inner end of the radially-extending section of the casing is directly connected to the insert.

21. A generally annular seal, comprising:
a sealing element disposed around and extending axially along a shaft, the sealing element comprising a lip configured to seal with the shaft, and the sealing element defining a pocket;
an insert attached to the sealing element and comprising a base disposed in the pocket and a radial extension extending outwards from the base; and
a casing comprising a radially-extending section attached to the insert and an axially-extending section connected to or integrally-formed with the radially extending section,
wherein at least a portion of the radially-extending section extends radially outward of the insert, and
wherein the axially-extending section is positioned radially outward of the sealing element and the insert, such that the insert is entirely radially inward of the axially-extending section.

22. The seal of claim 21, wherein an axially-facing end of the casing is attached to an axially-facing surface of the radial extension of the insert.

23. The seal of claim 21, wherein the shaft is movable with respect to the sealing element, the insert, and the casing.

24. The seal of claim 21, wherein the sealing element is formed at least partially from a first material, and the insert is formed at least partially from a second material, the first material being less rigid than the second material.

* * * * *